(12) United States Patent
Yamaguchi et al.

(10) Patent No.: US 9,393,889 B2
(45) Date of Patent: Jul. 19, 2016

(54) SEAT CUSHION FRAME FOR VEHICLE

(71) Applicant: Toray Industries, Inc., Tokyo (JP)

(72) Inventors: Koji Yamaguchi, Nagoya (JP); Masaru Tateyama, Nagoya (JP); Nobuhiko Shimizu, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/398,185

(22) PCT Filed: May 9, 2013

(86) PCT No.: PCT/JP2013/063043
§ 371 (c)(1),
(2) Date: Oct. 31, 2014

(87) PCT Pub. No.: WO2013/168769
PCT Pub. Date: Nov. 14, 2013

(65) Prior Publication Data
US 2015/0130254 A1    May 14, 2015

(30) Foreign Application Priority Data

May 11, 2012    (JP) .................................. 2012-109277

(51) Int. Cl.
| A47C 7/02 | (2006.01) |
| B60N 2/42 | (2006.01) |
| B60N 2/68 | (2006.01) |
| B60N 2/427 | (2006.01) |

(52) U.S. Cl.
CPC .......... B60N 2/4263 (2013.01); B60N 2/42718 (2013.01); B60N 2/42763 (2013.01); B60N 2/68 (2013.01)

(58) Field of Classification Search
CPC .... B60N 2/4263; B60N 2/42709; B60N 2/68; B60N 2/42718; B60N 2/42763
USPC ....................... 297/216.1, 452.15, 452.18, 487
See application file for complete search history.

(56) References Cited

U.S. PATENT DOCUMENTS

| 5,236,247 A | * | 8/1993 | Hewko ..................... A47C 7/16 |
| | | | 297/452.1 |
| 5,240,310 A | * | 8/1993 | Rink ....................... B60N 2/686 |
| | | | 248/429 |
| 5,284,381 A | * | 2/1994 | Aoki ......................... B60N 2/68 |
| | | | 297/452.1 |
| 5,575,533 A | * | 11/1996 | Glance ................... B60N 2/682 |
| | | | 297/232 |

(Continued)

FOREIGN PATENT DOCUMENTS

| DE | 102011002079 A1 * | 10/2012 | ........... B60N 2/4263 |
| JP | 2003-265261 A | 9/2003 | |

(Continued)

*Primary Examiner* — Laurie K Cranmer
(74) *Attorney, Agent, or Firm* — DLA Piper LLP (US)

(57) ABSTRACT

A seat cushion frame for a vehicle, wherein the weight of the entire frame can be reduced as a result of changing the raw material to a resin; and to give a desired submarine prevention function to the front section of the frame, to greatly reduce the number of components of the frame, and to greatly simplify the entire structure, a C-shaped frame having a C-shaped planar shape opening to the rear side thereof includes a thermoplastic resin, and has a structure wherein the upper surface side of the front section of the C-shaped frame is formed into a surface intermittently extending in the seat width direction and the lower surface side thereof is formed into a surface continuously extending in the seat width direction.

14 Claims, 4 Drawing Sheets

(56) References Cited

U.S. PATENT DOCUMENTS

| | | | | |
|---|---|---|---|---|
| 6,059,369 | A * | 5/2000 | Bateson | B29C 70/222 297/452.18 |
| 7,331,635 | B2 * | 2/2008 | Schwarz | B60N 2/5685 297/180.11 |
| 7,850,247 | B2 * | 12/2010 | Stauske | B60N 2/5621 297/452.24 |
| 8,308,235 | B2 * | 11/2012 | Ellison | B60N 2/7005 297/216.1 |
| 8,371,655 | B2 * | 2/2013 | Nonomiya | B60N 2/2356 297/216.14 |
| 8,408,655 | B2 * | 4/2013 | Ellison | B60N 2/015 297/216.1 |
| 9,039,081 | B2 * | 5/2015 | Arefi | B60N 2/686 297/188.08 |
| 2005/0168041 | A1 * | 8/2005 | Glance | B60N 2/68 297/452.18 |
| 2010/0001479 | A1 | 1/2010 | Trybus et al. | |
| 2011/0121628 | A1 * | 5/2011 | Kauffman | B60N 2/686 297/354.1 |
| 2012/0133193 | A1 * | 5/2012 | Abe | B60N 2/5825 297/452.55 |
| 2012/0187738 | A1 * | 7/2012 | Gross | B21D 26/14 297/452.1 |
| 2013/0169011 | A1 * | 7/2013 | Evans | B60N 2/4228 297/216.13 |

FOREIGN PATENT DOCUMENTS

| | | |
|---|---|---|
| JP | 2004-338632 A | 12/2003 |
| JP | 2007-504040 A | 3/2007 |
| JP | 2009-541108 A | 11/2009 |

* cited by examiner

FORMATION A

FORMATION B

W ←——→ W

COMPARATIVE FORMATION

W ←——→ W

SEAT CUSHION FRAME FOR VEHICLE

TECHNICAL FIELD

This disclosure relates to a seat cushion frame for a vehicle and, more specifically, to a seat cushion frame for a vehicle which lowers the weight of the entire frame structure as well as to reduce the number of components and increase rigidity and strength.

BACKGROUND

For example, as shown in FIG. 8, a seat cushion frame for a vehicle is generally composed of a frame 101 for a seat cushion and a frame 102 for a seat back connected thereto (for example, JP-A-2004-338632). A conventional seat cushion frame for a vehicle is formed mainly as a steel sheet metal construction, and a resin seat cushion frame substantially does not exist. Therefore, in the conventional structure, there is a limit in decreasing the weight of the seat cushion frame for a vehicle.

Further, for a seat cushion frame for a vehicle, there is a mechanism that prevents a front section of the seat cushion frame from excessively sinking (hereinafter, also referred to as a submarine prevention mechanism) is required to be provided to protect a passenger at the time of a collision, etc. For example, in JP '632, as shown in FIG. 8, a submarine prevention mechanism 103 having a complicated structure, separate from the seat cushion frame 102, is provided.

Furthermore, in a conventional steel seat cushion frame, although as the entire frame it is formed as a structure having a C-shaped planar shape opening to the rear side (the rear side of a seat), respective structural sections are manufactured as components separate from each other and it is structured by connecting them to each other.

As described above, because a conventional seat cushion frame for a vehicle is composed of steel, the weight is great, there is a limit in reducing the weight while securing a rigidity required for the entire seat cushion frame and, therefore, it is difficult to greatly reduce the weight.

Further, when a submarine prevention mechanism is attached, because a complicated mechanism is attached as a component separate from the seat cushion frame, the number of components increases and the structure as a whole also becomes complicated.

Furthermore, because a conventional seat cushion frame for a vehicle is structured by connecting respective structural members manufactured as components separate from each other, the number of components is great, and many operations are required for the assembly.

Accordingly, paying attention to such problems in the conventional seat cushion frame for a vehicle, it could be helpful to provide a seat cushion frame for a vehicle in which a great lightening in weight can be achieved by changing the raw material of the main structural component to a resin, and in which decreasing the number of components and simplification of the overall structure can be achieved in consideration of providing a submarine prevention function.

Further, it could be helpful to provide a seat cushion frame for a vehicle which, even if the raw material of the main structural component is changed to a resin, can secure sufficiently high rigidity and strength, and which can be easily manufactured.

SUMMARY

We provide a seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction.

We also provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, and wherein the thermoplastic resin contains reinforcing fibers.

We further provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, and wherein the front section id divided into a plurality of segments in the seat width direction by forming the upper surface side into a surface intermittently extending, and each of the segments is formed in an open bag shape opening toward a seat front side.

We further provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, and wherein a strip composite material containing reinforcing fibers extending in the seat width direction is integrated with the thermoplastic resin at the lower surface side of the front section.

We further provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, wherein a strip composite material containing reinforcing fibers extending in the seat width direction is integrated with the thermoplastic resin at the lower surface side of the front section, and wherein the composite material includes a thermoplastic resin as a matrix resin which is the same kind of or identical to the thermoplastic resin forming the C-shaped frame.

We further provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, wherein a strip composite material containing reinforcing fibers extending in the seat width direction is integrated with the thermoplastic resin at the lower surface side of the front section, and wherein the reinforcing fibers of the composite material include carbon fibers.

We further provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, and wherein at least a part of a side section of the C-shaped frame has a sectional shape opening toward outside of the frame.

We further provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, wherein at least a part of a side section of the C-shaped frame has a sectional shape opening toward outside of the frame, and wherein, in the sectional shape of at least a part of the side section of the C-shaped frame, a lower portion extends toward an outside portion of the frame longer than an upper portion.

We further provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, and wherein a composite material for reinforcement including reinforcing fibers and a resin is disposed on at least one of an upper surface and a lower surface of a side section of the C-shaped frame.

We further provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, wherein a composite material for reinforcement including reinforcing fibers and a resin is disposed on at least one of an upper surface and a lower surface of a side section of the C-shaped frame, and wherein the composite material for reinforcement including reinforcing fibers and a resin is disposed on each of the upper surface and the lower surface of the side section of the C-shaped frame, and the composite material for reinforcement on the upper surface is disposed more than the composite material for reinforcement on the lower surfaces.

We further provide the seat cushion frame for a vehicle, having a C-shaped planar shape opening to a rear side thereof, wherein the C-shaped frame includes a thermoplastic resin, and has a structure wherein an upper surface side of a front section of the C-shaped frame is formed into a surface intermittently extending in a seat width direction and a lower surface side thereof is formed into a surface continuously extending in the seat width direction, wherein a composite material for reinforcement including reinforcing fibers and a resin is disposed on at least one of an upper surface and a lower surface of a side section of the C-shaped frame, and wherein the reinforcing fibers of the composite material for reinforcement include carbon fibers.

EXPLANATION OF SYMBOLS

Figure 1:
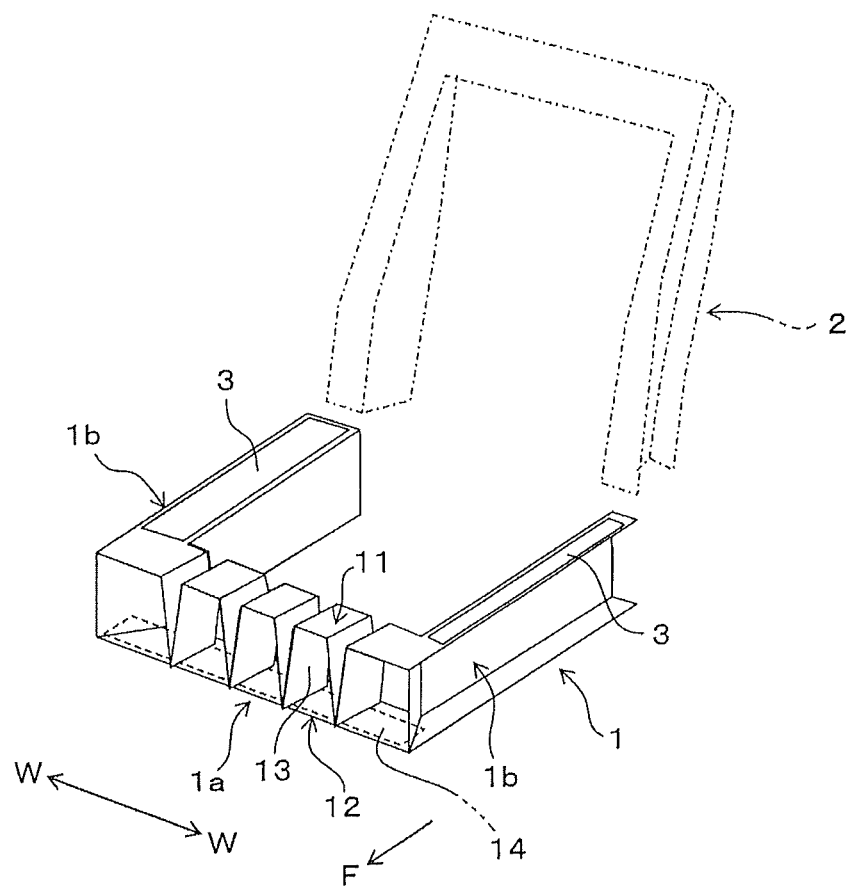
FIG. 1 is a schematic perspective view of a seat cushion frame for a vehicle.

1: seat cushion frame
1a, 21, 31: front section
1b, 41, 51: side section
2: seat back frame
3, 43a, 43b, 53a, 53b, 53c: composite material for reinforcement
11: upper surface of front section
12: lower surface of front section
13, 22, 32: small segment
14, 23, 33: strip-like composite material
42a, 52a: upper portion of side section
42b, 52b: lower portion of side section
52c: vertical wall portion of side section

DETAILED DESCRIPTION

We provide a seat cushion frame for a vehicle having a C-shaped planar shape opening to a rear side thereof characterized in that the C-shaped frame comprises a thermoplastic resin, and has a structure wherein an upper surface side of a front section of the C-shaped frame is formed into a surface intermittently extending in a seat width direction and a lower surface side thereof is formed into a surface continuously extending in the seat width direction.

In such a seat cushion frame for a vehicle, since substantially the whole of the seat cushion frame having a C-shaped planar shape is formed from a thermoplastic resin, it becomes possible to integrally mold substantially the whole of the seat cushion frame, for example, by injection molding and the like, as compared to a conventional steel frame, it becomes possible to greatly reduce the weight and it becomes unnecessary to connect respective structural members manufactured as components separate from each other and, therefore, it becomes possible to greatly decrease the number of components, to greatly decrease the number of operations for assembly and simplify the overall structure. In addition, since the front section of the C-shaped frame is formed into the structure wherein the upper surface side thereof is formed into a surface intermittently extending in the seat width direction and the lower surface side thereof is formed into a surface continuously extending in the seat width direction, when a load for sinking the front section of the seat cushion frame is applied to the front section at the time of a collision or the like and the front section is curved and deformed downwardly, adjacent upper surface parts among the upper surface formed intermittently are displaced in a direction approaching each other by the curving of the front section in the downward direction, and the curving and deformation is structurally stopped at the time when the end parts of adjacent upper surface portions come into contact with each other. As a result, more sinking, that is, an excessive sinking of the front section can be automatically prevented, and without providing a complicated submarine prevention mechanism, a desired submarine prevention function can be obtained. Since this submarine prevention function is different from a rapid displacement prevention by a mechanical engagement as in a conventional submarine prevention mechanism, and works to gradually absorb the load in a step at which the front section is gradually curved and deformed downwardly and, finally, as described above, to prevent more displacement by contact of the end parts of adjacent upper surface portions with each other, a passenger on the seat does not receive a great impact force as a reaction force as when a conventional submarine prevention mechanism is provided. Therefore, a desired submarine prevention function can be obtained also from the viewpoint of operation. Then, because it is not necessary to provide a complicated submarine prevention mechanism in the conventional technology, a decrease in the number of components and simplification of the overall structure can be further promoted.

In the above-described seat cushion frame for a vehicle, if a structure is employed wherein the above-described thermoplastic resin contains reinforcing fibers, while an integral molding of substantially the whole of the seat cushion frame becomes possible, it becomes possible to give sufficiently high rigidity and strength to the seat cushion frame even if the raw material of the main structural component is changed to a resin and, therefore, while the above-described decrease of the number of components and simplification of the overall structure can be achieved, it becomes possible to achieve a high rigidity and strength structure at the same time. This structure in which the above-described thermoplastic resin contains reinforcing fibers can be easily achieved by injection molding of the thermoplastic resin containing reinforcing fibers, or by a molding such that a thermoplastic resin is injected into a mold having been placed with a reinforcing fiber substrate therein, and it is possible to easily manufacture a desired seat cushion frame for a vehicle.

Further, in the seat cushion frame for a vehicle, a structure can also be employed wherein the above-described front section is divided into a plurality of small segments in the seat width direction by forming the upper surface side into a surface intermittently extending as described above, and each of the small segments is formed in an open bag-like shape opening toward a seat front side. In such a structure, it becomes possible to shapely give high rigidity and strength to the respective small segments, while the respective small segments are maintained in desired shapes, it becomes possible that the end parts of the upper surface portions of small segments adjacent to each other are approached and brought into contact with each other by curving the whole of the front section toward the downward direction and, therefore, while desired rigidity and strength of the respective portions of the front section are ensured, a desired submarine prevention function can be obtained. However, even if each of the small segments is formed in an open bag-like shape opening toward a seat front side, if the upper surface portions of small segments adjacent to each other are formed into a surface continuously extending in the seat width direction, a desired submarine prevention function cannot be obtained.

Further, in the seat cushion frame for a vehicle, in particular, a formation is preferred wherein a strip-like composite material containing reinforcing fibers extending in the seat width direction is integrated with the above-described thermoplastic resin at the lower surface side of the above-described front section. Since the strip-like composite material can exhibit a high tensile strength particularly in its longitudinal direction, by thus providing the strip-like composite material at the lower surface side of the front section, when the front section is curved and deformed downwardly, it can exhibit an excellent curving suppress function, and it suppresses the amount of displacement of the front section in the sinking direction small, while a desired rigidity against the deformation is given, a more desirable submarine prevention function can be exhibited. Since the lower surface side of the front section is formed into a surface continuously extending in the seat width direction, it is possible that such a strip-like composite material is easily integrated with and provided to the lower surface side.

As the above-described strip-like composite material, although, for example, a composite material comprising reinforcing fibers and a metal can be employed, it is preferably a composite material comprising reinforcing fibers and a resin from the viewpoint of maintaining the lightness in weight of the whole of the seat cushion frame. Especially, a formation is particularly preferred wherein the above-described composite material comprises a thermoplastic resin as a matrix resin which is same kind of or identical with the thermoplastic resin forming the above-described C-shaped frame. In such a formation, when the thermoplastic resin forming the C-shaped frame and the above-described strip-like composite material are integrated, a desired joint state therebetween can be obtained, desired rigidity and strength as the whole of the seat cushion frame for a vehicle can be ensured, and an excellent durability can also be obtained.

As the reinforcing fibers of above-described composite material, although arbitrary reinforcing fibers such as carbon fibers, glass fibers, aramide fibers, and the like can be used, from the viewpoint of effect for increasing the rigidity and strength and, further, from the viewpoint of easiness of designing the rigidity and strength, it is preferred that the reinforcing fibers comprise at least carbon fibers. In this connection, included are when the reinforcing fibers of the composite material are only carbon fibers and when the reinforcing fibers are of a combination of carbon fibers and other reinforcing fibers.

When the above-described composite material comprises a composite material of reinforcing fibers and a resin as the matrix resin thereof, although a thermoplastic resin and a thermosetting resin can be both used, as a preferred formation as described above, a formation can be raised wherein the composite material comprises a thermoplastic resin as a matrix resin which is the same kind of or identical to the thermoplastic resin forming the above-described C-shaped frame. As such a thermoplastic resin, for example, polyolefin-group resins such as polyethylene and polypropylene, polyamide-group resins such as nylon 6 and nylon 6, 6, polyester-group resins such as polyethylene terephthalate and polybutylene terephthalate, and resins such as polyether ketone, polyether sulfone and aromatic polyamide, can be exemplified. Further, also as the thermoplastic resin forming the C-shaped frame, similar resins can be used.

Further, in the seat cushion frame for a vehicle, to give desired rigidity and strength over the entire seat cushion frame, structural devices can be added also to a side section of the above-described C-shaped frame. For example, it is preferred that at least a part of a side section of the above-described C-shaped frame has a sectional shape opening toward outside of the frame. With respect to a lateral load due to a seat belt or a load due to side collision, if the sectional shape of the side section is a closed-space shape (a sectional shape such as a tubular shape or a box-type shape), there is a fear causing a breakage of a frame itself by a condition where the side section props up against the load and the like, but in such a structure as described above, by the structure where a part of the side section is formed in a sectional shape opening toward outside of the frame, it becomes possible to give the frame itself a performance capable of smoothly absorbing an energy without causing its breakage.

In the above-described structure where at least a part of the side section of the C-shaped frame has a sectional shape opening toward outside of the frame, in the opening section, a structure can be employed wherein an upper portion and a lower portion extend toward the outside of the frame by a same length, or a structure can also be employed wherein a lower portion is extended toward outside of the frame longer than an upper portion. In particular, in the latter structure, it becomes possible to achieve, while with respect to the upper portion, to secure a good energy absorbing function by having the above-described opening shape, with respect to the lower portion, to give an appropriately high rigidity to the frame itself by adequately extending the lower portion.

Further, in the seat cushion frame for a vehicle, a structure can be employed wherein a composite material for reinforcement comprising reinforcing fibers and a resin is disposed on at least one of an upper surface and a lower surface of a side section of the above-described C-shaped frame. Since for a seat cushion frame high rigidity and strength are required particularly against a load or an impact force applied in a vertical direction, the rigidity and strength of this frame section, ultimately, of the entire seat cushion frame, can be enhanced efficiently by the structure where the composite material for reinforcement is disposed on at least one of an upper surface and a lower surface of the side section of the seat cushion frame.

When the composite material for reinforcement comprising reinforcing fibers and a resin is disposed on each of the upper surface and the lower surface of the side section of the above-described C-shaped frame, it is preferred that the composite material on the upper surface is disposed more than the composite material on the lower surface. Since in a seat cushion frame a flexural moment is generated in the side section at the time of front-side collision or rear-side collision, thereby generating a great stress on the upper surface, the rigidity and strength of the frame can be enhanced efficiently by the structure where the composite material as a material for reinforcement is disposed on the upper surface.

It is preferred that the reinforcing fibers of such a composite material for reinforcement comprise carbon fibers, similarly to the aforementioned strip-like composite material provided at the lower surface side of the front section.

Thus, in the seat cushion frame for a vehicle, the weight of the entire frame can be greatly reduced, while a desired submarine prevention function is given to the front section of the frame, the number of components of the frame can be greatly reduced, and the overall structure can be greatly simplified.

Further, by containing reinforcing fibers in the thermoplastic resin forming the C-shaped frame, by dividing the front section of the frame into a plurality of small segments each formed in an open bag-like shape, or by providing a predetermined strip-like composite material integrally at the lower surface side of the front section, while a desired submarine prevention function can be obtained, high rigidity and strength can be achieved, and in addition, a seat cushion frame having such an excellent performance can be easily manufactured.

Furthermore, by adding structural devices also to the side section of the C-shaped frame, it becomes possible to give more desirable rigidity and strength to the entire frame.

Hereinafter, examples will be explained referring to the figures.

FIG. 1 shows an example of a seat cushion frame for a vehicle. In FIG. 1, symbol 1 indicates a seat cushion frame for a vehicle, and to the rear side of the seat cushion frame 1, a seat back frame 2 is rotatably connected. Seat cushion frame 1 has a C-shaped planar shape the rear side of which is set as its opening side, and has a front section 1a and side sections 1b on both sides. The whole of this C-shaped seat cushion frame 1 is formed from a thermoplastic resin, for example, an injection molded thermoplastic resin, and in the example shown in the figure, on each of the upper surfaces of both side sections 1b each having a cross-sectional shape opening toward the outside, to increase the rigidity and strength of this frame portion, a composite material for reinforcement 3 comprising reinforcing fibers extending at least in the extension direction of the frame portion is integrated with the thermoplastic resin part forming C-shaped seat cushion frame 1. The integration can be realized, for example, by disposing the composite material 3 arranged with reinforcing fibers in one direction (unidirectional fiber reinforced composite material) in a mold (not shown in the figure) at a condition of setting the orientation direction of the reinforcing fibers in a frame extension direction, and injecting a thermoplastic resin for forming the thermoplastic resin part into the mold to integrate the thermoplastic resin with the composite material 3. The reinforcing fibers of this composite material 3 preferably comprise carbon fibers. Further, separately from the structure of providing composite material 3, or together with that structure, reinforcing fibers also can be contained in the thermoplastic resin forming C-shaped seat cushion frame 1. Also as these reinforcing fibers, it is preferred to contain carbon fibers.

Figure 2:
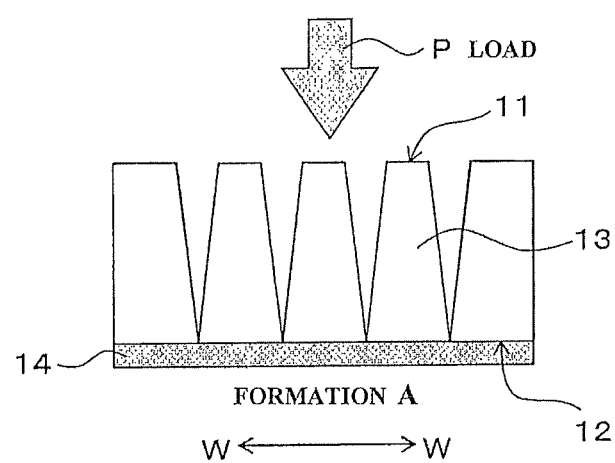
FIG. 2 is a schematic elevational view showing a strip-like composite material provided at a lower surface side of a front section of the frame depicted in FIG. 1.

As shown also in FIG. 2, in front section 1a of the above-described C-shaped seat cushion frame 1, the upper surface side thereof is formed into a surface 11 intermittently extending in a seat width direction W-W and the lower surface side thereof is formed into a surface 12 continuously extending in the seat width direction W-W. Further, in the example shown in the figure, by forming the upper surface side of front section 1a into the surface 11 intermittently extending in the seat width direction W-W, the front section 1a is divided into a plurality of small segments 13 in the seat width direction W-W, and each of the small segments 13 is formed in an open bag-like shape opening toward a seat front side F.

Further, in the example shown in the figure, each of the small segments 13 present in the central portion in the seat width direction W-W has a trapezoid shape bilaterally symmetric as viewed from the seat front side, and the respective sides of the trapezoid shape form the above-described open bag-like shape opening toward the seat front side F. Each of the small segments 13 present at both end portions in the seat width direction W-W has an asymmetric bilaterally trapezoid shape.

Furthermore, in the example shown in the figure, at the lower surface 12 side of front section 1a of the above-described seat cushion frame 1, a strip-like composite material 14 containing reinforcing fibers extending in the seat width direction W-W is provided to be integrated with the thermoplastic resin forming C-shaped seat cushion frame 1. This integration can be realized by bonding strip-like composite material 14 and also by integrally molding the strip-like composite material 14 placed in a mold with the thermoplastic resin for forming seat cushion frame 1 by injection molding of the thermoplastic resin and the like. In particular, in the latter case, it is preferred that strip-like composite material 14 uses a thermoplastic resin as its matrix resin which is the same kind of or identical to the thermoplastic resin forming the C-shaped frame 1. Also, as the reinforcing fibers of strip-like composite material 14, it is preferred that carbon fibers are contained.

In the above-described example, since substantially the whole of seat cushion frame 1 having a C-shaped planar shape is formed from a predetermined thermoplastic resin, it becomes possible to integrally mold at least substantially the whole of the thermoplastic resin part of the seat cushion frame 1, and as compared to a conventional steel frame, it becomes possible to greatly reduce the weight and greatly decrease the number of components, greatly decrease the number of operations for assembly and simplify the overall structure. Further, since the upper surface side of front section 1a of the C-shaped frame 1 is formed into surface 11 intermittently extending in the seat width direction W-W and the lower surface side thereof is formed into surface 12 continuously extending in the seat width direction W-W, when a load P to sink the front section 1a of the seat cushion frame 1 is applied to the front section 1a an upper side as shown in FIG. 2 at the time of a collision or the like, although the front section 1a is being curved and deformed downwardly, at that time, adjacent upper surface parts among the upper surface 11 formed intermittently are displaced in a direction approaching each other, and the curving and deformation is structurally stopped at the time when the end parts of the adjacent upper surface portions come into contact with each other. Namely, as the load P increases, the amount of the curving and deformation of front section 1a toward the downward direction gradually increases (the amount of displacement due to sinking of upper surface 11 increases), the amount of the curving and deformation (the amount of displacement due to sinking) becomes approximately constant at the time when the end parts of the adjacent upper surface portions come into contact with each other. As a result, a desired submarine prevention function can be obtained wherein the load P is gradually absorbed and sinking to an extent more than a certain amount can be prevented. Since this submarine prevention function is different from a rapid displacement prevention by a mechanical engagement as in a conventional submarine prevention mechanism, and works to gradually absorb the load P in a step at which the front section is gradually curved and deformed downwardly and finally, as described above, to prevent the more displacement by the contact of the end parts of adjacent upper surface portions with each other, a fear giving a rapid impact to a passenger on the seat disappears.

Moreover, in the above-described example, in particular, since front section 1a of seat cushion frame 1 is divided into a plurality of small segments 13 in the seat width direction W-W each of which has an open bag-like shape opening toward the seat front side F, the strength and rigidity of the respective small segments 13 are kept structurally, and desired strength and rigidity of the front section 1a itself can be ensured as well as more deformation and sinking can be prevented more securely at the time when the end parts of adjacent upper surface portions of the respective small segments 13 are brought into contact with each other, and therefore, the submarine prevention function is realized at a desirable condition. In addition, in the above-described example, in particular, since strip-like composite material 14 containing reinforcing fibers extending in the seat width direction W-W is integrally provided at the lower surface 12 side of front section 1a of seat cushion frame 1, the desired strength and rigidity of the front section 1a itself can be further ensured as well as the rigidity and strength against the load P from the upper side can be enhanced and, therefore, also from the viewpoint of performance for absorbing load, a more desirable submarine prevention function can be realized.

With respect to the open bag-like shape opening toward the seat front side F, of a plurality of the small segments divided in the seat width direction W-W in front section 1a of sheet cushion frame 1 in the above-described example, except the formation shown in FIG. 2 (formation A), various formations can be employed. For example, as shown with another formation B in FIG. 3, it is possible that, in a front section 21 of a sheet cushion frame, the open bag-like shape opening toward the seat front side, of a plurality of small segments 22 divided in the seat width direction W-W, is formed in a square shape from the lower surface side, on which a strip-like composite material 23 is provided integrally, up to a halfway toward the upper side, and from the halfway up to the upper surface, it is formed in a trapezoid shape. In such a structure, since in the region where the portions formed in square shapes are adjacent to each other, higher strength and rigidity can be exhibited against the curving and deformation of front section 21 in its sinking direction, a higher deformation suppressing function (sinking displacement suppressing function) can be exhibited against the load P from the upper side, and when the curving and deformation (a displacement due to sinking) becomes a certain level, the trapezoid shapes located at positions higher than the square shapes work, and a deformation suppressing function (sinking displacement suppressing function) similar to that in the above-described example can be exhibited.

Figure 3:
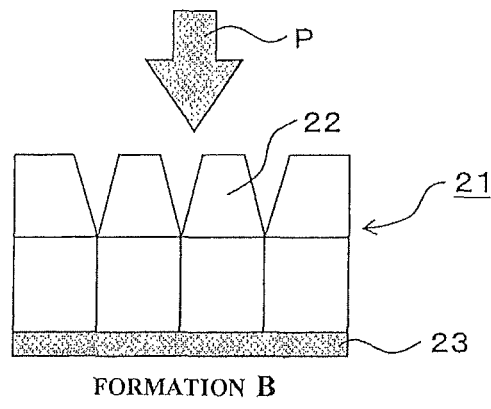
FIG. 3 is a schematic elevational view showing a strip-like composite material provided at a lower surface side of a front section of a seat cushion frame according to an example different from that depicted in FIG. 2.
Figure 4:
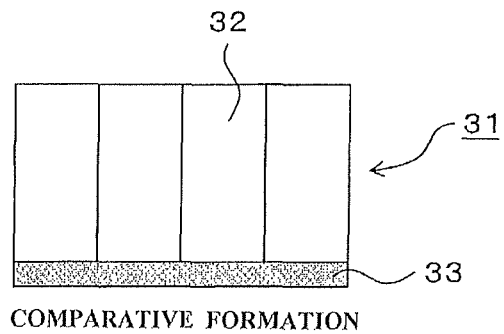
FIG. 4 is a schematic elevational view showing a strip-like composite material provided at a lower surface side of a front section of a seat cushion frame according to a reference example shown for comparison to the examples depicted in FIGS. 2 and 3.
Figure 5:
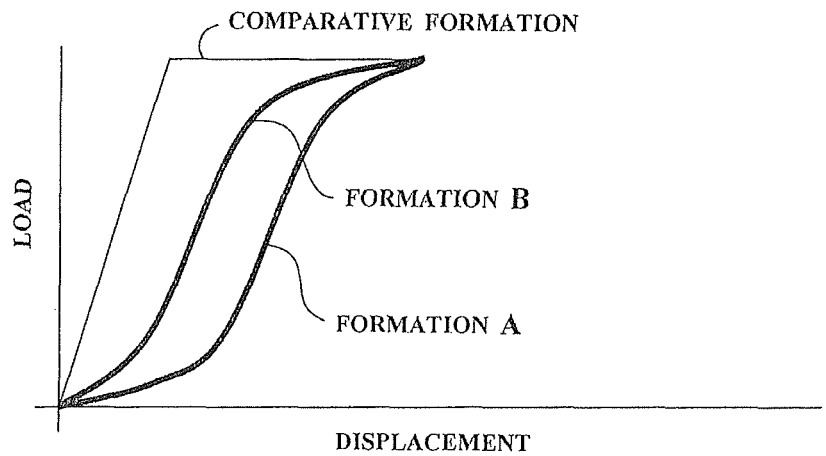
FIG. 5 is a schematic diagram showing relationships between load and displacement in the examples depicted in FIGS. 2 to 4.

Schematic properties (schematic properties showing relationships between load and displacement) of formation A shown in FIG. 2 and formation B shown in FIG. 3 are shown in FIG. 5 together with a schematic property of a formation shown in FIG. 4 for comparison. In the comparative formation shown in FIG. 4, in a front section 31 of a sheet cushion frame, the open bag-like shape opening toward the seat front side, of a plurality of small segments 32 divided in the seat width direction W-W, is formed in a square shape from the lower surface side, on which a strip-like composite material 33 is provided integrally, upwardly up to the upper surface, and because the upper surfaces of the respective small segments 32 are directly adjacent to each other, the upper surface of the front section 31 is not formed into a surface intermittently extending in the seat width direction W-W, but into a continuously extending surface.

As shown in FIG. 5, in formation A shown in FIG. 2 and formation B shown in FIG. 3, against the load from the upper side, the front section of the sheet cushion frame is displaced gradually and smoothly in the sinking direction, and against a load more than a certain level, the displacement is prevented. The formation B is a formation in which the displacement is more suppressed up to halfway with respect to increase in the load. On the other hand, in the comparative formation, the load rapidly increase until the displacement reaches a small certain level, and because the displacement of the front section is too small, a rapid load, that is, an impact force, is applied to a passenger. Further, in this comparative formation, after reaching a certain great load, there is a fear that the displacement is promoted even in the load does not increase, and because such a condition is a condition where a breakage by compression progresses at the upper surface side of the front section, it is not preferred.

Figure 6:
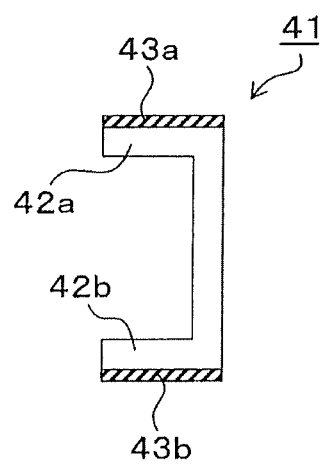
FIG. 6 is a schematic sectional view showing an example of a structure of a side section of a seat cushion frame.

Further, to give more desired rigidity and strength over the entire seat cushion frame, structural devices can be added also to a side section of the C-shaped frame. For example, as shown in FIG. 6, it is preferred that at least a part of a side section 41 of the C-shaped frame has a sectional shape opening toward outside of the frame. In such a structure, by forming at least a part of side section 41 in a sectional shape opening toward outside of the frame, it becomes possible to give the frame itself at that portion an excellent energy absorbing performance capable of smoothly absorbing an energy. Further, in the structure shown in FIG. 6, on at least one of an upper surface and a lower surface of side section 41, on both surfaces thereof in the example shown in the figure, namely, on both of an upper surface of upper portion 42a and a lower surface of lower portion 42b, composite materials for reinforcement 43a and 43b each comprising reinforcing fibers and a resin are disposed, thereby adequately enhancing the rigidity and strength of the side section 41. When composite materials for reinforcement 43a and 43b are thus disposed on both of the upper surface and the lower surface of side section 41, as aforementioned, it is preferred that the composite material 43a on the upper surface is disposed more than the composite material 43b on the lower surface.

Figure 7:
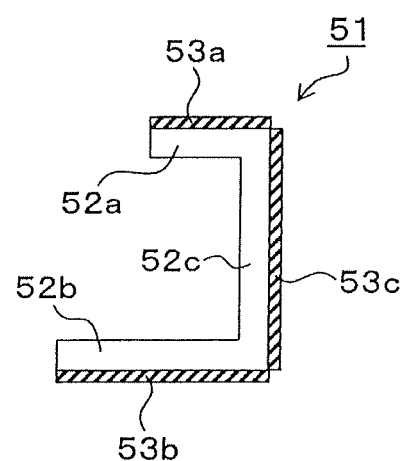
FIG. 7 is a schematic sectional view showing another example of a structure of a side section of a seat cushion frame.
Figure 8:
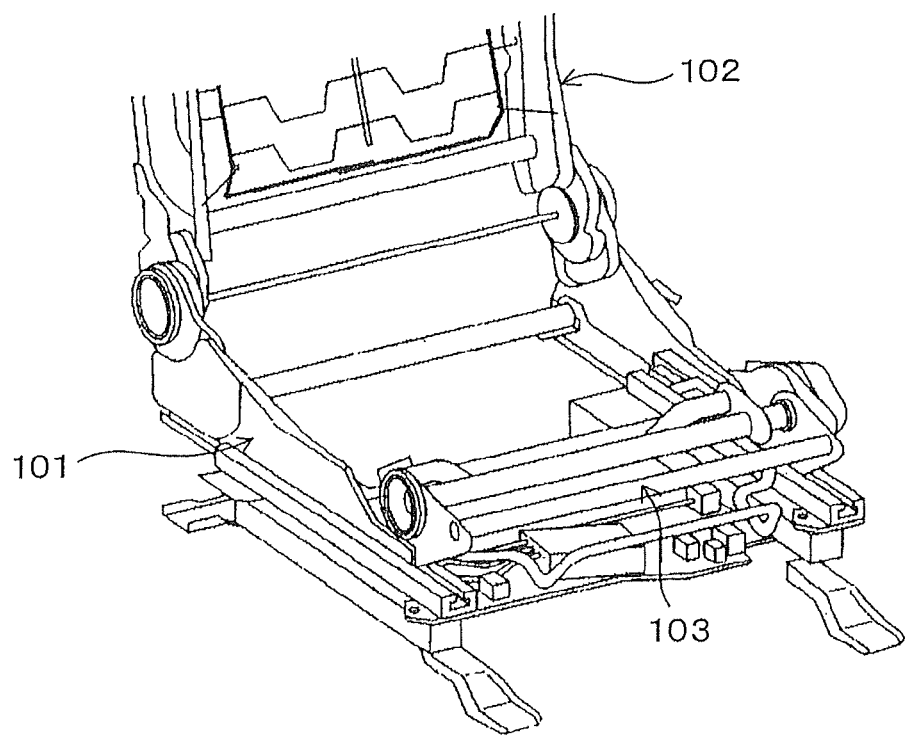
FIG. 8 is a schematic perspective view of a conventional seat cushion frame for a vehicle.

Further, for example, a structure shown in FIG. 7 can also be employed. In the structure shown in FIG. 7, at least a part of a side section 51 of the C-shaped frame is formed in a structure having a sectional shape opening toward outside of the frame, and in the opening section, a lower portion 52b is extended toward outside of the frame longer than an upper portion 52a. Further, the respective parts of upper portion 52a, lower portion 52b and a vertical wall portion 52c therebetween are reinforced by composite materials for reinforcement 53a, 53b and 53c each containing reinforcing fibers. In such a structure of side section 51, as aforementioned, by the sectional shape opening toward outside of the frame, it becomes possible to smoothly absorb an energy without causing a breakage of the frame itself against a lateral load due to a seat belt or a load due to a lateral collision, by extending lower portion 52b longer toward outside of the frame, it becomes possible to give an adequately high rigidity to the frame itself while ensuring the above-described good energy absorbing performance. Also, in the above-described composite materials for reinforcement 53a, 53b and 53c, it is preferred that carbon fibers are contained as the reinforcing fibers, similarly in strip-like composite material 14 provided at the lower surface side of the aforementioned front section.

INDUSTRIAL APPLICATIONS

Our designs can be applied to any of seat cushion frames for vehicles which are made of a metal at the present time.

The invention claimed is:

1. A seat cushion frame for a vehicle, having a C-shaped frame with a planar shape opening to a rear side thereof, wherein 1) said C-shaped frame comprises a thermoplastic resin, and has a structure wherein an upper surface side of a front section of said C-shaped frame is formed into a surface intermittently extending in a seat width direction and a lower surface side thereof is formed into a surface continuously extending in said seat width direction, wherein said front section is divided into a plurality of segments in said seat width direction and each of said segments is formed in an open bag shape opening toward a seat front side, and at least a part of each of said segments has a trapezoidal shape, and 2) a composite material for reinforcement comprising reinforcing fibers and a resin is disposed on at least one of an upper surface and a lower surface of a side section of said C-shaped frame, wherein said composite material for reinforcement comprising reinforcing fibers and a resin is disposed on each of said upper surface and said lower surface of said side section of said C-shaped frame, and there is a greater amount of said composite material for reinforcement on said upper surface than said composite material for reinforcement on said lower surface.

2. The seat cushion frame according to claim 1, wherein said thermoplastic resin contains reinforcing fibers.

3. The seat cushion frame according to claim 2, wherein a strip composite material containing reinforcing fibers extending in said seat width direction is integrated with said thermoplastic resin at said lower surface side of said front section.

4. The seat cushion frame according to claim 2, wherein at least a part of a side section of said C-shaped frame has a sectional shape opening toward outside of said frame.

5. The seat cushion frame according to claim 1, wherein a strip composite material containing reinforcing fibers extending in said seat width direction is integrated with said thermoplastic resin at said lower surface side of said front section.

6. The seat cushion frame according to claim 5, wherein at least a part of a side section of said C-shaped frame has a sectional shape opening toward outside of said frame.

7. The seat cushion frame according to claim 5, wherein said composite material comprises a thermoplastic resin as a matrix resin which is the same kind of or identical to said thermoplastic resin forming said C-shaped frame.

8. The seat cushion frame according to claim 7, wherein said reinforcing fibers of said composite material comprise carbon fibers.

9. The seat cushion frame according to claim 7, wherein at least a part of a side section of said C-shaped frame has a sectional shape opening toward outside of said frame.

10. The seat cushion frame according to claim 5, wherein said reinforcing fibers of said composite material comprise carbon fibers.

11. The seat cushion frame according to claim 10, wherein at least a part of a side section of said C-shaped frame has a sectional shape opening toward outside of said frame.

12. The seat cushion frame according to claim 1, wherein at least a part of a side section of said C-shaped frame has a sectional shape opening toward outside of said frame.

13. The seat cushion frame according to claim 12, wherein, in said sectional shape of at least a part of said side section of said C-shaped frame, a lower portion extends toward an outside portion of said frame longer than an upper portion.

14. The seat cushion frame according to claim 1, wherein said reinforcing fibers of said composite material for reinforcement comprise carbon fibers.

* * * * *